(12) United States Patent
Ramasubramanian et al.

(10) Patent No.: US 10,641,866 B2
(45) Date of Patent: May 5, 2020

(54) FAILURE DETECTION IN A RADAR SYSTEM

(71) Applicant: Texas Instruments Incorporated, Dallas, TX (US)

(72) Inventors: Karthik Ramasubramanian, Bangalore (IN); Karthik Subburaj, Bangalore (IN); Jasbir Singh Nayyar, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 545 days.

(21) Appl. No.: 15/229,927

(22) Filed: Aug. 5, 2016

(65) Prior Publication Data

US 2018/0038943 A1    Feb. 8, 2018

(51) Int. Cl.
*G01S 7/35* (2006.01)
*G01S 7/40* (2006.01)
*G01S 13/931* (2020.01)
*G01S 13/34* (2006.01)

(52) U.S. Cl.
CPC ............ *G01S 7/4021* (2013.01); *G01S 7/352* (2013.01); *G01S 13/931* (2013.01); *G01S 13/34* (2013.01); *G01S 2007/358* (2013.01)

(58) Field of Classification Search
CPC .. G01S 13/34; G01S 13/931; G01S 2007/358; G01S 7/352; G01S 7/4021
USPC .......................................................... 342/173
See application file for complete search history.

(56) References Cited

U.S. PATENT DOCUMENTS

| | | | |
|---|---|---|---|
| 5,369,411 A * | 11/1994 | Lisle, Jr. ................ | G01S 7/4021 342/194 |
| 7,002,511 B1 | 2/2006 | Ammar et al. | |
| 9,264,282 B2 * | 2/2016 | Cui ......................... | H04L 27/389 |
| 2006/0140291 A1 | 6/2006 | Thomas, Jr. | |
| 2007/0171123 A1 | 7/2007 | Nakano | |
| 2011/0053535 A1* | 3/2011 | Yamagishi .............. | G01S 7/021 455/205 |

FOREIGN PATENT DOCUMENTS

| | | |
|---|---|---|
| DE | 102010030628 | 12/2011 |
| JP | 2008203148 | 9/2008 |

* cited by examiner

*Primary Examiner* — Timothy A Brainard
(74) *Attorney, Agent, or Firm* — Ronald O. Neerings; Charles A. Brill; Frank D. Cimino

(57) ABSTRACT

A radar system is provided that includes a receive channel including a complex baseband and a processor coupled to the receive channel to receive a first plurality of digital intermediate frequency (IF) samples from an in-band (I) channel of the complex baseband and a corresponding second plurality of digital IF samples from a quadrature (Q) channel of the complex baseband, wherein the processor is configured to execute instructions to compute at least one failure metric based on the first plurality of digital IF samples and the second plurality of digital IF samples.

39 Claims, 2 Drawing Sheets

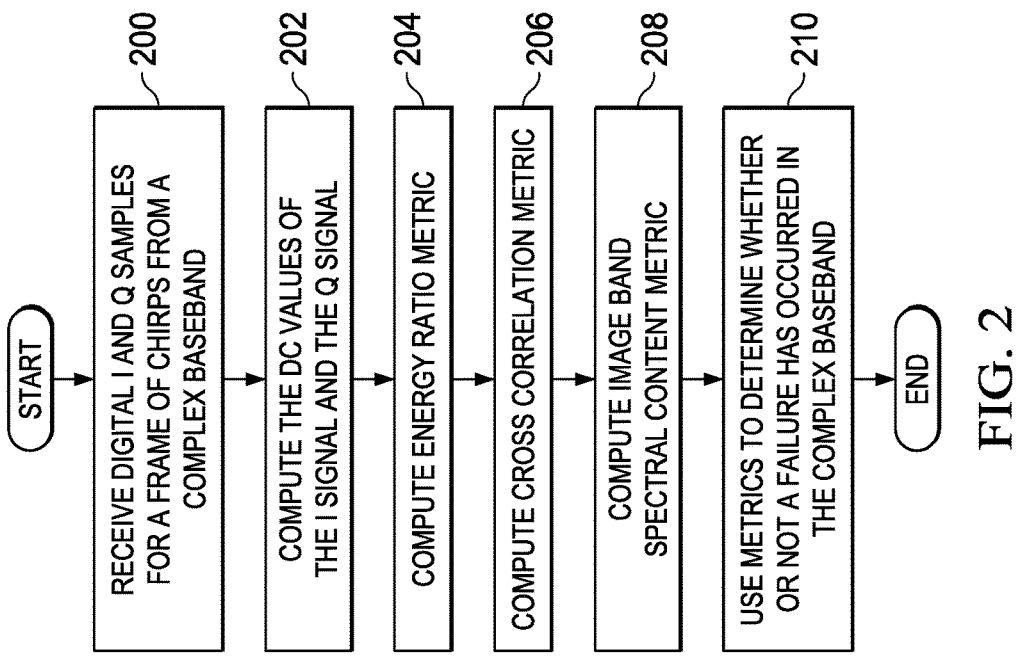
FIG. 2
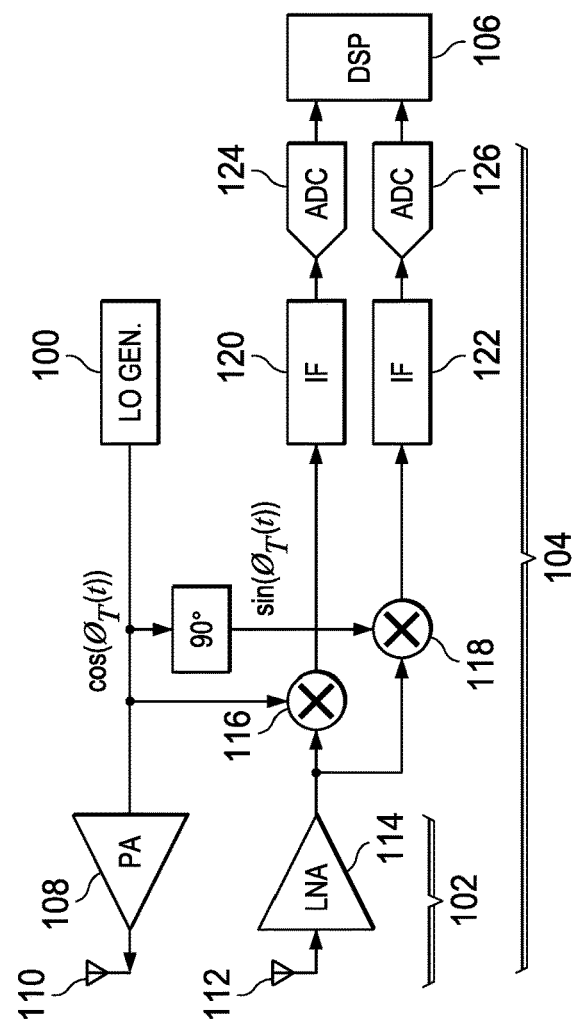
FIG. 1
FIG. 3

FAILURE DETECTION IN A RADAR SYSTEM

BACKGROUND OF THE DISCLOSURE

Field of the Disclosure

Embodiments of the present disclosure generally relate to radar systems, and more specifically relate to failure detection in radar systems.

Description of the Related Art

A new class of safety systems, referred to as advanced driver assistance systems (ADAS), has been introduced into automobiles to reduce human operation error. These systems are enabled by smart sensors based primarily on millimeter-wave automotive radars. The proliferation of such assistance systems, which may provide functionality such as rear-view facing cameras, electronic stability control, and vision-based pedestrian detection systems, has been enabled in part by improvements in microcontroller and sensor technologies. Enhanced embedded radar-based solutions are enabling complementary safety features for ADAS designers.

In an automotive radar system, one or more radar sensors may be used to detect obstacles around the vehicle and the speeds of the detected objects relative to the vehicle. A processing unit in the radar system may determine the appropriate action needed, e.g., to avoid a collision or to reduce collateral damage, based on signals generated by the radar sensors. Current automotive radar systems are capable of detecting objects and obstacles around a vehicle, the position of any detected objects and obstacles relative to the vehicle, and the speed of any detected objects and obstacles relative to the vehicle. Via the processing unit, the radar system may, for example, alert the vehicle driver about potential danger, prevent a collision by controlling the vehicle in a dangerous situation, take over partial control of the vehicle, or assist the driver with parking the vehicle.

Automotive radar systems are required to meet the functional safety specifications of International Standard 26262 titled "Road Vehicles—Functional Safety." ISO 26262 defines functional safety as the absence of unreasonable risk caused by malfunctioning behavior of electrical/electronic systems. Functional safety in automotive radar is the prevention of harm to humans due to failure of components in the radar. For automotive radar, the radar should be known to be functioning appropriately within a fault tolerant time interval of approximately 100 milliseconds (ms). Thus, while the vehicle is operating, a failure in any part of the radar that would lead to a degraded signal-to-noise ratio (SNR) or false detection of presence or position of obstacles should be detected, and an appropriate response performed within approximately 100 ms.

SUMMARY

Embodiments of the present disclosure relate to methods and apparatus for failure detection in a radar system. In one aspect, a radar system is provided that includes a receive channel including a complex baseband and a processor coupled to the receive channel to receive a first plurality of digital intermediate frequency (IF) samples from an in-band (I) channel of the complex baseband and a corresponding second plurality of digital IF samples from a quadrature (Q) channel of the complex baseband, wherein the processor is configured to execute instructions to compute at least one failure metric based on the first plurality of digital IF samples and the second plurality of digital IF samples.

In one aspect, a method for failure detection in a radar system is provided that includes receiving a first plurality of digital intermediate frequency (IF) samples from an in-band (I) channel of a complex baseband of a receive channel of the radar system and a corresponding second plurality of digital IF samples from a quadrature (Q) channel of the complex baseband, computing at least one failure metric based on the first plurality of digital IF samples and the second plurality of digital IF samples, and determining whether or not a failure has occurred based on the at least one failure metric.

BRIEF DESCRIPTION OF THE DRAWINGS

Particular embodiments will now be described, by way of example only, and with reference to the accompanying drawings:

FIG. 1 is a block diagram of an example Frequency Modulated Continuous Wave (FMCW) radar system with a complex baseband in the receive channel;

FIG. 2 is a flow diagram of a method for failure detection in a complex baseband of an FMCW radar system;

FIG. 3 is a block diagram of an example Frequency Modulated Continuous Wave (FMCW) radar system.

DETAILED DESCRIPTION OF EMBODIMENTS OF THE DISCLOSURE

Figure 4:
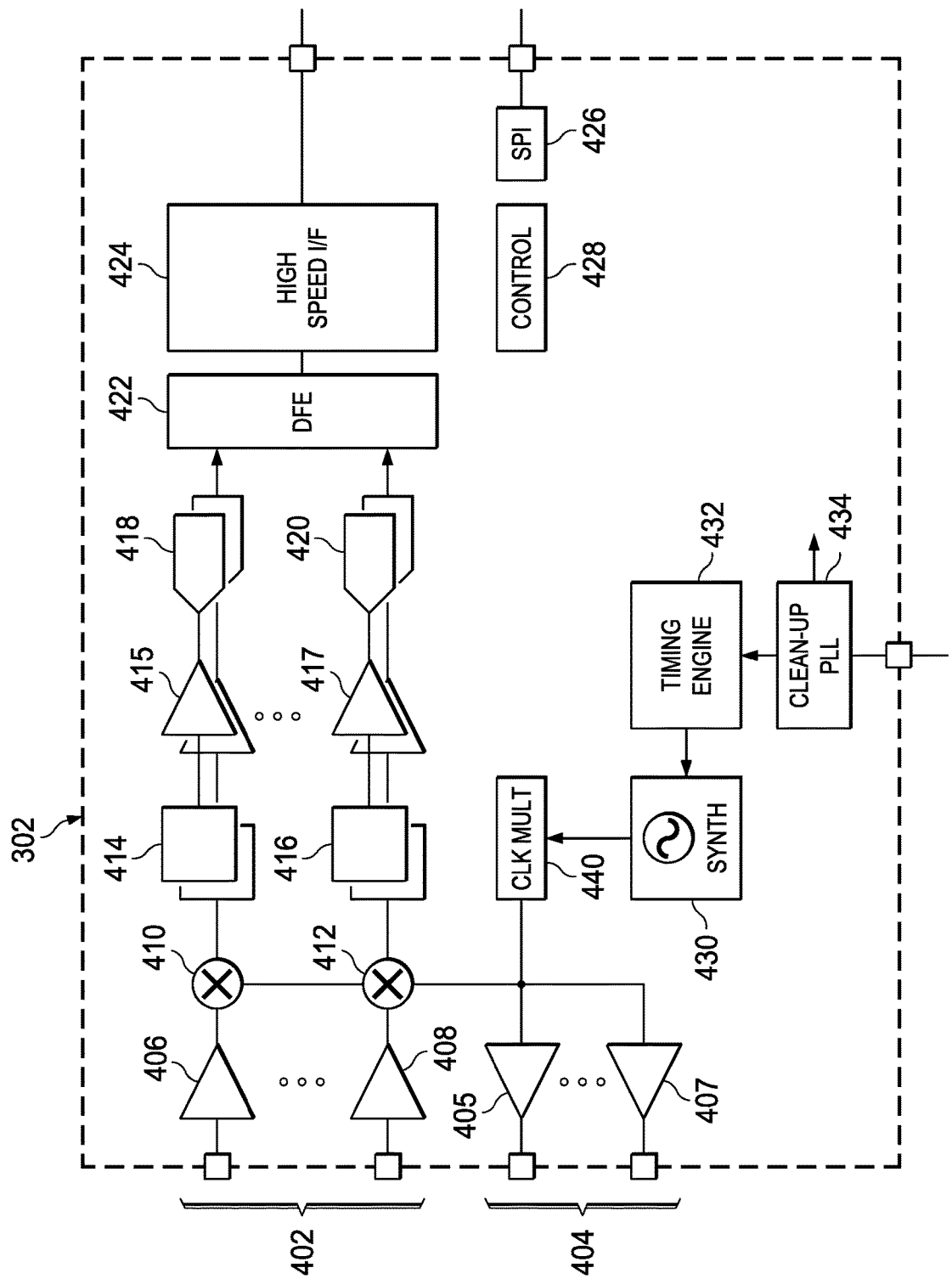
FIG. 4 is a block diagram of an embodiment of the radar system-on-a-chip (SOC) in the FMCW radar of FIG. 3.

Specific embodiments of the disclosure will now be described in detail with reference to the accompanying figures. Like elements in the various figures are denoted by like reference numerals for consistency.

Embodiments of the disclosure provide for functional safety monitoring in the receive channel(s) of a radar system as the radar system is used, e.g., in an operating vehicle. More specifically, in various embodiments, performance of components in each complex baseband in the radar system is monitored by computing one or more failure metrics based on signals generated in the I (in-band) channel and the Q (quadrature) channel of each complex baseband. The failure metrics are computed during normal operation of the radar system without disrupting the primary radar function. The failure metrics may be one or more of the ratio of energy of the received signals in the I channel and the Q channel of a complex baseband, the cross-correlation between the received signals in the I channel and the Q channel of a complex baseband, and the spectral content in the image band.

Embodiments are described herein in reference to Frequency Modulated Continuous Wave (FMCW) radar. As is well known, an FMCW radar transmits, via one or more transmit antennas, a radio frequency (RF) frequency ramp referred to as a chirp. Further, multiple chirps may be transmitted in a unit referred to as a frame. The transmitted chirps are reflected from any objects in the field of view (FOV) of the radar and are received by one or more receive antennas. The received signal for each receive antenna is down-converted to an intermediate frequency (IF) signal and then digitized. Once the digitized data for an entire frame is received, the data is processed to detect any objects in the FOV and to identify the range, velocity and angle of arrival of detected objects.

FIG. 1 is a block diagram of an example Frequency Modulated Continuous Wave (FMCW) radar system with a complex baseband in the receive channel. In this example, the FMCW radar system includes a local oscillator generator (LO Gen) 100, a transmit channel 102, a receive channel 104, and a digital signal processor (DSP) 106. The LO generator 100 is configured to generate a frequency modulated radio frequency (RF) signal for transmission via the transmit channel 102. The transmit channel includes a power amplifier (PA) 108 coupled to the LO generator 100 to receive and amplify the RF signal and a transmit antenna 110 coupled to the PA to receive the amplified signal for transmission.

The receive channel 104 includes a receive antenna 112 to receive a reflected transmitted RF signal, a low-noise amplifier (LNA) 114 coupled to the receive antenna 112 to receive and amplify the received RF signal, and a complex baseband coupled to the LNA 114 to receive the amplified received RF signal. The complex baseband includes an I channel and a Q channel. Each channel includes a mixer 116, 118 coupled to the LNA 114 to receive the signal. Each mixer 116, 118 is also coupled to the LO generator 100 to receive the original RF signal. In particular, the mixer 116 in the I channel receives the signal in-phase and the mixer 118 in the Q channel receives the signal ninety degrees out of phase. The mixers 116, 188 mix the input signals to generate respective I and Q IF signals. Each mixer 116, 188 serves as a down converter that generates an output signal with a frequency equal to the difference between the frequency of the inputs received from the LNA 114 and the LO generator 100.

In each channel, an intermediate frequency (IF) amplifier 120, 122 is coupled to the respective mixer 116, 118 to receive the respective IF signal. Each IF amplifier 120, 122 may include, for example, a baseband bandpass filter for filtering the IF signal and a variable gain amplifier (VGA) for amplifying the filtered IF signal. An analog-to-digital converter (ADC) 124, 126 is coupled to each IF amplifier 120, 122 to receive and convert respective analog I and Q IF signals to digital signals. Each ADC 124, 126 is also coupled to a digital signal processor (DSP) 106 to provide the digital signals to the DSP 106 for FMCW radar signal processing. The DSP 106 may also be programmed to execute instructions implementing an embodiment of the failure detection method of FIG. 2. As is explained in more detail in reference to FIG. 3, the DSP may be used to compute one or more failure metrics using the samples received from the complex baseband. The failure metric or metrics can then be used to detect failures, if any, of components in the complex baseband.

FIG. 2 is a flow diagram of a method for failure detection using a complex baseband of an FMCW radar system. The method is described assuming a single complex baseband in single receive channel. For radar systems with multiple receivers, each having a complex baseband, the method may be performed for each complex baseband. Initially, digital I and Q IF samples for a frame of chirps are received 200 from the I and Q channels of the complex baseband. The DC (direct current) offsets of the signal from the I channel and the signal from the Q channel are then computed 202. The respective DC offsets may be computed as the average of the samples from the respective channel.

An energy ratio failure metric $M_1$ is then computed 204. The energy ratio failure metric is the ratio of energy of the received signals in the I channel and the Q channel. The expectation is that this failure metric should be close to unity. Some failures can be detected by checking whether or not this failure metric is significantly different from unity. The failure metric may be computed as per $$M_1 = E\{|I|^2\}/E\{|Q|^2\}$$

where $E\{.\}$ denotes expectation, i.e., the mean squared energy of the samples from the respective I or Q channel. For example, $E\{|I|^2\}$ is computed as per $$E\{|I|^2\} = \frac{\sum_{i=1}^{n} |I_i|^2}{n}$$

where n is the number of I samples. $E\{|Q|^2\}$ is similarly computed. While not specifically shown, the respective DC offset is subtracted from each sample before this failure metric is computed.

A cross correlation failure metric $M_2$ is also computed 206. The cross correlation failure metric measures the cross-correlation between the signals received in the I and Q channels. The expectation is that this failure metric should be close to zero. Some failures can be detected by checking whether or not this failure metric is significantly different from zero. The failure metric may be computed as per $$M_2 = E\{IQ\}/\mathrm{sqrt}(E\{|I|^2\} \times E\{|Q|^2\})$$

where $E\{|I|^2\}$ and $E\{|Q|^2\}$ are computed as previously described and EOM is computed as per $$E\{IQ\} = \sum_{i=1}^{n} (I_i \times Q_i)$$

where n is the number I sample and Q samples. While not specifically shown, the respective DC offset is subtracted from each sample before this failure metric is computed.

An image band spectral content failure metric $M_3$ is also computed 208. The term "image band" refers to the mirror frequency spectrum of the actual beat frequency (in-band) spectrum. In a functional FMCW radar, peaks corresponding to detected objects should be present on only one side of the spectrum. Some failures can be detected by checking for excess content in the image band. More specifically, in the absence of component failure, the image band spectrum should only include thermal noise. Thus, some failures can be detected by checking for excess or unexpected (spurious) signal content in the image band, i.e., signal content that is not representative of thermal noise. The value of this failure metric is set to indicate whether or not spurious content is present in the image band.

The failure metric may be computed, for example, as a ratio of the energy in the image band to the thermal or overall noise level of the receive channel. Any suitable technique may be used to compute this failure metric. For example, in some embodiments, the failure metric may be computed by computing the complex Fast Fourier Transform (FFT) of I+jQ sample data and comparing the image band bins, i.e., the negative FFT bins, to a thermal noise energy threshold. Spurious content in the image band is indicated if any of the image band bins exceeds the threshold and the value of $M_3$ is set accordingly. In some embodiments, the failure metric may be computed by passing the complex I+jQ data through a filter to extract only the image band content and the energy of the filtered samples (containing the image band signal) is used as the metric. In this latter case, the filtered samples are compared with a thermal noise energy threshold to detect excess or unexpected signal content in the image band.

The value of the thermal noise energy threshold may be determined, for example, empirically or using probability analysis calculations, such that in the absence of any failure, there is very little chance that a sample including random thermal noise exceeds the threshold. The expected thermal noise level of a receive channel may be determined, for example, based on production tests, by observing the ADC output samples during functional operation, or by using special calibration modes of operation in which the receive channel is operated with the transmit channel (TX) turned off, or the receive channel (RX) is operated in an internal TX-to-RX loopback test mode.

In some embodiments, the spectral content failure metric may be computed in sub-bands within the image band, thus allowing any spurious content (spikes) in the image band to be detected more accurately. That is, the thermal noise in each sub-band would be smaller and hence the spurious content can be detected more easily. In such embodiments, a different thermal noise threshold may be needed for each sub-band as the amount of thermal noise in each sub-band may vary. The expected thermal noise level in each sub-band may be determined as previously described for the entire image band.

Interference from another radar, e.g., the radar of an on-coming vehicle, can also cause failure detection when using the image band spectral content failure metric. This may be desired or undesired depending on the application. If the presence of interference is to be treated as detection of a failure failure, then the image band spectral content failure metric can be used without modification. However, if only a permanent failure in the receive chain circuitry should be treated as detection of a failure, then the image band spectral content metric should be conditionally ignored whenever presence of interference from another radar is suspected. Such interference from another radar is typically a transient phenomenon, affecting only a few samples in a chirp. The presence of interference can be detected, for example, as a temporary spike in the time domain I and Q samples received. A temporary spike in the time domain samples may be determined, for example, as a function of the root mean square, also referred to as the quadratic mean, of either the I or Q time domain samples. If interference is detected, the image band spectral content failure metric may be ignored, e.g., the failure metric $M_3$ may be set to indicate no spurious content even if the metric computation indicated spurious content.

Interference from another radar should affect both the I channel and Q channel similarly. In some embodiments, if interference is detected in the time domain samples, the time domain samples corresponding to the temporary spike in each of the I channel and the Q channel may be compared to a spike detection threshold. If one channel shows a spike and the other does not, then a failure of the complex baseband may be indicated, e.g., the failure metric $M_3$ may be set to indicate spurious content despite the fact interference was detected. The value of the spike detection threshold may be determined, for example, empirically or using probability analysis calculations, such that in the absence of any failure, there is very little chance that a sample exceeds the threshold.

Referring still to FIG. 2, once the failure metrics are computed, the failure metrics are used to determine 210 whether or not a failure has occurred in the complex baseband. For example, the energy ratio failure metric $M_1$ may be compared to a threshold to determine if the metric is sufficiently close to unity. Similarly, the cross correlation failure metric $M_2$ may be compared to a threshold to determine if the metric is sufficiently close to zero. Each threshold may be determined, for example, empirically or using probability analysis calculations, such that in the absence of any failure, there is little chance that the corresponding metric exceeds the threshold. Further, the value of the image band spectral content failure metric $M_3$ may checked to see if spurious content was detected in the image band. If any one of these failure metrics indicates a failure, then a failure of the radar system has occurred.

The above method is executed during normal operation of the radar system. Given that the complex baseband(s) of the radar system are operating correctly, the failure metrics confirm that there are no failures of the types the failure metrics are designed to detect. Further, the failure metrics are robust to various normal operating conditions. For example, if there are no objects in the FOV of the radar system, the received signal will be thermal noise, which for a correctly operating radar system (after compensating for any IQ mismatch) will satisfy $M_1 \cong 1$ and $M_2 \cong 0$ and $M_3$ will show no spurious spectral content. In another example, if there are one or more objects in the FOV of the radar system, the received signal will contain beat frequency tone(s) corresponding to the object or objects, which should be on one side of the complex baseband spectrum. A correctly operating radar system (after compensating for any IQ mismatch) will satisfy $M_1 \cong 1$ and $M_2 \cong 0$ and $M_3$ will show no spurious spectral content.

Tables 1-4 illustrate the simulated results of using the failure metrics in four example failure cases in four example scenarios. Table 1 illustrates simulated failure detection results for each failure metric when there is a gain drop (failure) in an I channel by 3 dB, using a threshold of 2 dB for $M_1$. Table 2 illustrates simulated failure detection results for each failure metric when there is a phase change (failure) in a Q channel by 10 degrees. Table 3 illustrates simulated failure detection results for each failure metric when a Q channel fails such that only noise is coming out of the channel at a level similar to the thermal noise level. Table 4 illustrates simulated failure detection results when a Q channel fails such that only noise is coming out of the channel at a level similar to the I channel overall power (signal+noise).

TABLE 1

| Example Scenarios | $M_1$ | $M_2$ | $M_3$ | Comments |
|---|---|---|---|---|
| No objects present | ALERT! | — | — | $M_1$ detects the failure in all four scenarios. |
| One or more strong objects present | ALERT! | — | ALERT! | $M_3$ also detects the failure when objects are strong |
| One or more strong objects present, strong bumper reflection (filtered out) | ALERT! | — | ALERT! | |
| One or more very weak objects present | ALERT! | — | — | |

TABLE 2

| Example Scenarios | $M_1$ | $M_2$ | $M_3$ | Comments |
|---|---|---|---|---|
| No objects present | — | ALERT! | — | $M_2$ detects the failure in all four scenarios. |
| One or more strong objects present | — | ALERT! | ALERT! | $M_3$ also detects the failure when objects are strong. |

TABLE 2-continued

| Example Scenarios | $M_1$ | $M_2$ | $M_3$ | Comments |
|---|---|---|---|---|
| One or more strong objects present, strong bumper reflection (filtered out) | — | ALERT! | ALERT! | |
| One or more very weak objects present | — | ALERT! | — | |

TABLE 3

| Example Scenarios | $M_1$ | $M_2$ | $M_3$ | Comments |
|---|---|---|---|---|
| No objects present | — | — | — | Failure not detected, but probably inconsequential. |
| One or more strong objects present | ALERT! | — | ALERT! | $M_1$ and $M_3$ detect the failure when objects are strong |
| One or more strong objects present, strong bumper reflection (filtered out) | ALERT! | — | ALERT! | |
| One or more very weak objects present | — | — | ALERT! | $M_3$ is the only one that detects the failure |

TABLE 4

| Example Scenarios | $M_1$ | $M_2$ | $M_3$ | Comments |
|---|---|---|---|---|
| No objects present | — | — | — | Failure not detected, but probably inconsequential. |
| One or more strong objects present | ALERT! | — | — | Only $M_1$ detects the failure in these cases. |
| One or more strong objects present, Strong Bumper reflection (filtered out) | ALERT! | — | — | |
| One or more very weak objects present | — | — | ALERT! | $M_3$ is the only one that works in this case. |

FIG. 3 is a block diagram of an example Frequency Modulated Continuous Wave (FMCW) radar system 300 configured to perform failure detection using the complex basebands of the receive channels of the radar system during normal operation in a vehicle. The example FMCW radar system 300 includes a radar system-on-a-chip (SOC) 302, a processing unit 304, and a network interface 306. An example architecture of the radar SOC 302 is described in reference to FIG. 4.

The radar SOC 302 is coupled to the processing unit 304 via a high speed serial interface. In another embodiment, the processing unit 304 may be integrated inside the radar SOC 302. As is explained in more detail in reference to FIG. 4, the radar SOC 302 includes multiple receive channels, each having a complex baseband that generates a pair of digital I and Q IF signals (alternatively referred to as dechirped signals, beat signals, or raw radar signals) that are provided to the processing unit 304 via the high speed serial interface.

The processing unit 304 includes functionality to perform radar signal processing, i.e., to process the received radar signals to determine, for example, distance, velocity, and angle of any detected objects. The processing unit 304 may also include functionality to perform post processing of the information about the detected objects, such as tracking objects, determining rate and direction of movement, etc. Further, the processing unit 304 includes functionality to perform failure detection using each pair of digital I and Q IF signals. More specifically, the processing unit 304 includes functionality to compute one or more of the previously described metrics as per an embodiment of the method of FIG. 2 for each complex baseband in the radar SOC 302 based on the digital I and Q IF signals generated in the complex baseband. Further the processing unit 304 includes functionality to cause a radar failure to be indicated to an operator of the vehicle via the network interface 106 based on the computed metric(s).

The processing unit 304 may include any suitable processor or combination of processors as needed for the processing throughput of the application using the radar data. For example, the processing unit 304 may include a digital signal processor (DSP), a microcontroller (MCU), an SOC combining both DSP and MCU processing, or a field programmable gate array (FPGA) and a DSP.

The processing unit 304 may provide control information as needed to one or more electronic control units in the vehicle via the network interface 306. Electronic control unit (ECU) is a generic term for any embedded system in a vehicle that controls one or more the electrical system or subsystems in the vehicle. Types of ECU include, for example, electronic/engine control module (ECM), power train control module (PCM), transmission control module (TCM), brake control module (BCM or EBCM), central control module (CCM), central timing module (CTM), general electronic module (GEM), body control module (BCM), and suspension control module (SCM).

The network interface 306 may implement any suitable protocol, such as, for example, the controller area network (CAN) protocol, the FlexRay protocol, or Ethernet protocol.

FIG. 4 is a block diagram of an example radar SOC 302. The radar SOC 302 may include multiple transmit channels 404 for transmitting FMCW signals and multiple receive channels 402 for receiving the reflected transmitted signals. The transmit channels 404 are identical and include a power amplifier 405, 407 to amplify the transmitted signal and antenna. A receive channel includes a suitable receiver and antenna. Further, each of the receive channels 402 are identical and include a low-noise amplifier (LNA) 406, 408 to amplify the received signal coupled to a complex baseband.

Each complex baseband includes a quadrature mixer 410, 412 to mix the signal generated by transmission generation circuitry in the SOC 302 with the received signal to generate analog I and Q IF signals, a pair of baseband bandpass filters 414, 416 for filtering respective analog I and Q IF signals signal, a pair of variable gain amplifiers 415, 417 for amplifying respective filtered analog I and Q IF signals, and a pair of analog-to-digital converters 418, 420 for converting respective analog I and Q IF signals to digital I and Q IF signals. The quadrature mixer 410 serves as a down converter that generates output signals with a frequency equal to the difference between the frequency of the inputs received from the low-noise amplifier and the transmission generation circuitry, both of which are radio frequency (RF) signals. The bandpass filter, VGA, and ADC of a receive channel may be collectively referred to as a baseband chain or baseband filter chain. Further, the bandpass filter and VGA may be collectively referred to as an IF amplifier.

The receive channels 402 are coupled to the digital front end (DFE) component 422 to provide the digital I and Q IF signals to the DFE 422. The DFE 422 may include functionality to perform decimation filtering on the digital I and Q IF signals to reduce the data transfer rate. The DFE 422 may also perform other operations on the digital IF signals, e.g., digital compensation of non-idealities in the receive channels, such as inter-RX gain imbalance non-ideality, inter-RX phase imbalance non-ideality and the like. The DFE 422 is coupled to the high speed serial interface (I/F) 424 to transfer decimated digital I And Q IF signals to the processing unit 306.

The serial peripheral interface (SPI) 426 provides an interface for communication with the processing unit 306. For example, the processing unit 306 may use the SPI 426 to send control information, e.g., timing and frequencies of chirps, output power level, triggering of monitoring functions, etc., to the control module 428.

The control module 428 includes functionality to control the operation of the radar SOC 302. The control module 428 may include, for example, a buffer to store output samples of the DFE 422, an FFT (Fast Fourier Transform) engine to compute spectral information of the buffer contents, and an MCU that executes firmware to control the operation of the radar SOC 302.

The programmable timing engine 432 includes functionality to receive chirp parameter values for a sequence of chirps in a radar frame from the control module 428 and to generate chirp control signals that control the transmission and reception of the chirps in a frame based on the parameter values. The chirp parameters are defined by the radar system architecture and may include, for example, a transmitter enable parameter for indicating which transmitters to enable, a chirp frequency start value, a chirp frequency slope, a chirp duration, indicators of when the transmit channels should transmit and when the DFE output digital should be collected for further radar processing, etc. One or more of these parameters may be programmable.

The radio frequency synthesizer (SYNTH) 430 includes functionality to generate FMCW signals for transmission based on chirp control signals from the timing engine 432. In some embodiments, the SYNTH 430 includes a phase locked loop (PLL) with a voltage controlled oscillator (VCO).

The clock multiplier 440 increases the frequency of the transmission signal (LO signal) to the LO frequency of the mixers 410, 412. The clean-up PLL (phase locked loop) 434 operates to increase the frequency of the signal of an external low frequency reference clock (not shown) to the frequency of the SYNTH 430 and to filter the reference clock phase noise out of the clock signal.

The clock multiplier 440, synthesizer 430, timing generator 432, and clean up PLL 434 are an example of transmission generation circuitry. The transmission generation circuitry generates a radio frequency (RF) signal as input to the transmit channels and as input to the quadrature mixers in the receive channels via the clock multiplier. The output of the transmission generation circuitry may be referred to as the LO (local oscillator) signal or the FMCW signal.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which the metrics are computed at the frame level. One of ordinary skill in the art will understand embodiments in which the metrics are computed for each chirp in a frame or for sequences of chirps in a frame.

In another example, embodiments have been described herein in which all three metrics are computed. One of ordinary skill in the art will understand embodiments in which one metric is computed or any two of the metrics are computed.

In another example, embodiments have been described herein in which the computation of the metrics and the failure determination is performed in a processor external to a radar SOC. One of ordinary skill in the art will understand embodiments in which the computation of the metrics is performed by a processor on the radar SOC and the results communicated to a processor external to the SOC for failure determination, and embodiments in which bothe the computation of the metrics and the failure determination are performed by a processor on the SOC, with a failure indication communicated to a processor external to the SOC.

In another example, one of ordinary skill in the art will understand embodiments in which one or more of the components in a complex baseband may differ from those described herein.

In another example, embodiments have been described herein in reference to FMCW radar. One of ordinary skill in the art will understand embodiments for other types of radar modulation.

In another example, some embodiments have been described herein in which the radar system is an embedded radar system in a vehicle. One of ordinary skill in the art will understand embodiments for other applications of embedded radar systems, e.g., surveillance and security applications, maneuvering a robot in a factory or warehouse, industrial fluid level sensing, etc.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Software instructions implementing all or portions of methods described herein may be initially stored in a computer-readable medium and loaded and executed by a processor. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Certain terms are used throughout the description and the claims to refer to particular system components. As one skilled in the art will appreciate, components in radar systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A radar system comprising:
   a receive channel comprising a complex baseband;
   a processor coupled to the receive channel to receive a first plurality of digital intermediate frequency (IF) samples from an in-band (I) channel of the complex baseband and a corresponding second plurality of digital IF samples from a quadrature (Q) channel of the complex baseband, wherein the processor is configured to execute instructions to compute at least one failure metric based on the first plurality of digital IF samples and the second plurality of digital IF samples in order to detect a functional safety failure in the radar system.

2. The radar system of claim 1, wherein the first plurality of digital IF samples and the second plurality of IF samples correspond to one selected from a group consisting of a frame of chirps, a single chirp in a frame, and a sequence of chirps in a frame.

3. The radar system of claim 1, wherein the radar system is a Frequency Modulated Continuous Wave (FMCW) radar system.

4. The radar system of claim 1, wherein the processor is configured to execute instructions to compute at least one failure metric based on the first plurality of digital IF samples and the second plurality of digital IF samples in order to detect a functional safety failure in the radar system.

5. The radar system of claim 1, wherein the failure metric is a functional safety failure metric.

6. The radar system of claim 5, wherein the failure metric is used to identify a failure in any part of the radar system that would lead to a degraded signal-to-noise ratio (SNR).

7. The radar system of claim 5, wherein the failure metric is used to identify false detection or presence or position of obstacles.

8. The radar system of claim 1, wherein the failure metric is used to identify a component failure in the radar system.

9. The radar system of claim 8, wherein the component failure is in the complex baseband.

10. A radar system comprising:
    a receive channel comprising a complex baseband;
    a processor coupled to the receive channel to receive a first plurality of digital intermediate frequency (IF) samples from an in-band (I) channel of the complex baseband and a corresponding second plurality of digital IF samples from a quadrature (Q) channel of the complex baseband, wherein the processor is configured to execute instructions to compute at least one failure metric based on the first plurality of digital IF samples and the second plurality of digital IF samples, wherein the at least one failure metric is computed as a ratio of energy in the first plurality of digital IF samples and the second plurality of digital IF samples.

11. A radar system comprising:
    a receive channel comprising a complex baseband;
    a processor coupled to the receive channel to receive a first plurality of digital intermediate frequency (IF) samples from an in-band (I) channel of the complex baseband and a corresponding second plurality of digital IF samples from a quadrature (Q) channel of the complex baseband, wherein the processor is configured to execute instructions to compute at least one failure metric based on the first plurality a digital IF samples and the second plurality of digital IF samples and wherein the at least one failure metric is computed as a measure of cross-correlation between the first plurality of digital IF samples and the second plurality of digital IF samples.

12. A radar system comprising:
    a receive channel comprising a complex baseband;
    a processor coupled to the receive channel to receive a first plurality of digital intermediate frequency (IF) samples from an in-band (I) channel of the complex baseband and a corresponding second plurality of digital IF samples from a quadrature (Q) channel of the complex baseband, wherein the processor is configured to execute instructions to compute at least one failure metric based on the first plurality of digital IF samples and the second plurality of digital IF samples, wherein the at least one failure metric is computed by checking for signal content in an image band in excess of thermal noise.

13. The radar system of claim 12, wherein signal content in the image band in excess of thermal noise is detected by comparing negative bins of a complex Fast Fourier Transform of I+jQ sample data.

14. The radar system of claim 12, wherein the at least one failure metric is computed by checking sub-bands of the image band for signal content in excess of thermal noise.

15. The radar system of claim 12, wherein the at least one failure metric is not used if interference from another radar is detected.

16. The radar system of claim 12, wherein if interference from another radar is detected, the at least one failure metric is recomputed as a comparison of interference detected in the first plurality of digital IF samples and interference detected in the second plurality of digital IF samples.

17. A method for failure detection in a radar system, the method comprising:
    receiving a first plurality of digital intermediate frequency (IF) samples from an in-band (I) channel of a complex baseband of a receive channel of the radar system and a corresponding second plurality of digital IF samples from a quadrature (Q) channel of the complex baseband;
    computing at least one failure metric based on the first plurality of digital IF samples and the second plurality of digital IF samples; and
    determining whether or not a failure has occurred based on the at least one failure metric.

18. The method of claim 17, wherein computing at least one failure metric comprises computing a ratio of energy in the first plurality of digital IF samples and the second plurality of digital IF samples.

19. The method of claim 17, wherein computing at least one failure metric comprises computing a measure of cross-correlation between the first plurality of digital IF samples and the second plurality of digital IF samples.

20. The method of claim 17, wherein computing at least one failure metric comprises checking for signal content in an image band in excess of thermal noise.

21. The method of claim 12, wherein signal content in the image hand in excess of thermal noise is detected by comparing negative bins of a complex Fast Fourier Transform of I+jQ sample data.

22. The method of claim 12, wherein computing at least one failure metric comprises checking sub-bands of the image band for signal content in excess of thermal noise.

23. The method of claim 12, wherein determining whether or not a failure has occurred comprises ignoring the at least one failure metric when interference from another radar is detected.

24. The method of claim 12, wherein computing at least one failure metric comprises recomputing the at least one failure metric as a comparison of interference detected in the first plurality of digital IF samples and interference detected in the second plurality of digital IF samples if interference from another radar is detected.

25. The method of claim 17, wherein the first plurality of digital IF samples and the second plurality of IF samples correspond to one selected from a group consisting of a frame of chirps, a single chirp in a frame, and a sequence of chirps in a frame.

26. The method of claim 17, wherein the radar system is a Frequency Modulated Continuous Wave (FMCW) radar system.

27. A method for failure detection in a radar system, the method comprising:
   receiving a first plurality of digital intermediate frequency (IF) samples from an in-band (I) channel of a complex baseband of a receive channel of the radar system and a corresponding second plurality of digital IF samples from a quadrature (Q) channel of the complex baseband; and
   computing at least one failure metric based on the first plurality of digital IF samples and the second plurality of digital IF samples in order to detect a functional safety failure in the radar system.

28. The method system of claim 27, wherein the failure metric is a functional safety failure metric.

29. The method of claim 28, wherein the failure metric is used to identify a failure in any part of the radar system that would lead to a degraded signal-to-noise ratio (SNR).

30. The method of claim 28, wherein the failure metric is used to identify false detection or presence or position of obstacles.

31. The method system of claim 27, wherein the failure metric is used to identify a component failure in the radar system.

32. The method system of claim 31, wherein the component failure is in the complex baseband.

33. A method for failure detection in a radar system, the method comprising:
   receiving a first plurality of digital intermediate frequency (IF) samples from an in-band (I) channel of a complex baseband of a receive channel of the radar system and a corresponding second plurality of digital IF samples from a quadrature (Q) channel of the complex baseband; and
   computing at least one failure metric based on the first plurality of digital IF samples and the second plurality of digital IF samples, wherein computing at least one failure metric comprises computing a ratio of energy in the first plurality of digital IF samples and the second plurality of digital IF samples.

34. A method for failure detection in a radar system, the method comprising:
   receiving a first plurality of digital intermediate frequency (IF) samples from an in-band (I) channel of a complex baseband of a receive channel of the radar system and a corresponding second plurality of digital IF samples from a quadrature (Q) channel of the complex baseband; and
   computing at least one failure metric based on the first plurality of digital IF samples and the second plurality of digital IF samples, wherein computing at least one failure metric comprises computing a measure of cross-correlation between the first plurality of digital IF samples and the second plurality of digital IF samples.

35. A method for failure detection in a radar system, the method comprising:
   receiving a first plurality of digital intermediate frequency (IF) samples from an in-band (I) channel of a complex baseband of a receive channel of the radar system and a corresponding second plurality of digital IF samples from a quadrature (Q) channel of the complex baseband; and
   computing at least one failure metric based on the first plurality of digital IF samples and the second plurality of digital IF samples, wherein computing at least one failure metric comprises checking for signal content in an image band in excess of thermal noise.

36. The method of claim 35, wherein signal content in the image band in excess of thermal noise is detected by comparing negative bins of a complex Fast Fourier Transform of I+jQ sample data.

37. The method of claim 35, wherein computing at least one failure metric comprise checking sub-bands of the image band for signal content in excess of thermal noise.

38. The method of claim 35, wherein determining whether or not a failure has occurred comprises ignoring the at least one failure metric when interference from another radar is detected.

39. The method of claim 35, wherein computing at least one failure metric comprises recomputing the at least one failure metric as a comparison of interference detected in the first plurality of digital IF samples and interference detected in the second plurality of digital IF samples if interference from another radar is detected.

* * * * *